United States Patent
Zou et al.

(10) Patent No.: US 8,826,695 B2
(45) Date of Patent: Sep. 9, 2014

(54) METHOD FOR MANUFACTURING OPTICAL GLASS ELEMENT

(75) Inventors: Xuelu Zou, Shinjuku-ku (JP); Yasuhiro Fujiwara, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 889 days.

(21) Appl. No.: 12/295,611

(22) PCT Filed: Mar. 28, 2007

(86) PCT No.: PCT/JP2007/056673
§ 371 (c)(1),
(2), (4) Date: May 1, 2009

(87) PCT Pub. No.: WO2007/119565
PCT Pub. Date: Oct. 25, 2007

(65) Prior Publication Data
US 2010/0018252 A1    Jan. 28, 2010

(30) Foreign Application Priority Data
Mar. 31, 2006    (JP) .................................. 2006-100819

(51) Int. Cl.
| C03B 11/00 | (2006.01) |
| C03C 17/34 | (2006.01) |
| C03B 25/02 | (2006.01) |
| C03C 3/068 | (2006.01) |
| C03C 3/155 | (2006.01) |

(52) U.S. Cl.
CPC ....... *C03C 17/3441* (2013.01); *C03C 2218/154* (2013.01); *C03B 25/02* (2013.01); *C03C 2218/355* (2013.01); *C03C 2218/33* (2013.01); *C03C 3/068* (2013.01); *C03C 3/155* (2013.01)
USPC ................ 65/62; 65/63; 65/64; 65/65; 65/66; 65/37

(58) Field of Classification Search
USPC ...................... 65/62, 63, 64, 65, 66
See application file for complete search history.

(56) References Cited

U.S. PATENT DOCUMENTS

| 5,192,352 A * | 3/1993 | Kuwabara et al. ........... 65/60.53 |
| 5,843,200 A | 12/1998 | Richards |
| 7,179,536 B1 * | 2/2007 | Hosoe et al. .................. 428/446 |
| 2003/0211929 A1 | 11/2003 | Hayashi et al. |
| 2004/0106507 A1 | 6/2004 | Kasuga et al. |
| 2005/0049135 A1 * | 3/2005 | Hayashi .......................... 501/78 |
| 2006/0234850 A1 | 10/2006 | Hayashi et al. |
| 2008/0119348 A1 | 5/2008 | Hayashi et al. |

FOREIGN PATENT DOCUMENTS

| CN | 1445188 A | 10/2003 |
| CN | 1495137 A | 5/2004 |
| JP | 57-004735 A | 1/1982 |
| JP | 60-033221 A | 2/1985 |
| JP | 2002-284542 A | 10/2002 |
| JP | 2003-267748 A | 9/2003 |

OTHER PUBLICATIONS

Chinese Office Action corresponding to Chinese Patent Application No. 200780016433.4, dated Mar. 8, 2011.
Rejection Decision corresponding to Chinese Patent Application No. 200780016433.4, dated Mar. 31, 2012.
Chinese Office Action corresponding to Chinese Patent Application No. 200780016433.4, dated Nov. 22, 2011.
Japanese Office Action corresponding to Japanese Patent Application No. 2006-100819, dated May 15, 2012.
Reexamination Notification dated Mar. 4, 2014, issued by the State Intellectual Property Office of the P.R.C. in corresponding Chinese Application No. 200780016433.4.

* cited by examiner

*Primary Examiner* — Queenie Dehghan
(74) *Attorney, Agent, or Firm* — Sughrue Mion, PLLC

(57) ABSTRACT

A method for manufacturing an optical glass element, comprising: annealing a press-molded product obtained by press molding into a lens shape a glass material comprised of a core portion comprised of an optical glass (first glass) with a transition temperature of 550° C. or higher and a covering portion comprised of a second glass covering the surface of said core portion; and then removing the covering layer from the surface of the press-molded product to obtain an optical glass element. To provide a method for manufacturing high-optical-performance mold-pressed lenses in which the defective external appearance of optical elements comprised of high-temperature glass materials with a Tg of 550° C. or higher is prevented.

21 Claims, No Drawings

US 8,826,695 B2

METHOD FOR MANUFACTURING OPTICAL GLASS ELEMENT

CROSS-REFERENCE TO RELATED APPLICATIONS

This application is a National Stage of International Application No. PCT/JP2007/056673 filed on Mar. 28, 2007, claiming priority under Japanese Patent Application 2006-100819, filed on Mar. 31, 2006, the entire contents of which are hereby incorporated herein by reference.

TECHNICAL FIELD

The present invention relates to a method for manufacturing a high-precision optical glass element. More specifically, the present invention relates to a method for the manufacturing with high productivity of an optical glass element of adequately low strain that is mounted in an optical system such as an image pickup apparatus from optical glass having a glass transition temperature of 550° C. or higher.

BACKGROUND ART

Methods of manufacturing optical elements such as lenses by precision mold pressing that afford adequate optical performance without requiring mechanical processing such as grinding or polishing of the optically functional surfaces formed by press molding are known. Further, the management of optical characteristics is indispensable in the manufacturing of optical glass elements. These are determined by the specifications of the optical product in which the optical glass element is employed. Normally, prescribed optical constants (often typically denoted by the refractive index nd and Abbé number ν(nu)d) are managed along with their permissible ranges (tolerances). It is known that optical glasses having various ranges of optical constants can be obtained by selecting various glass compositions.

The need for optical materials with high refractive indexes has increased as small image pickup apparatuses such as cameras, videos, and portable terminals have been packed with greater numbers of pixels and rendered more lightweight and compact. Conventionally, glasses with high refractive indexes have been mainly low dispersion glasses. However, there is a need for glasses with high refractive indexes but lower dispersion in small image pickup apparatuses such as those mentioned above. Further, glass materials such as the above that are suited to precision mold pressing are needed to manufacture aspherical lenses with high productivity.

Glass materials for precision molding that have a low Tg are desirable from the perspective of the durability of the pressing mold and mold release film employed. However, a high Tg is unavoidable in satisfying the required optical constants and achieving glass stability.

The present inventors have previously proposed glass materials for precision molding that have high refractive indexes and are in the medium dispersion range. For example, these glass materials have a refractive index nd of 1.70 to 1.90 and an Abbé number ν(nu)d of 25 to 65. Since the compositions thereof are selected to satisfy the above optical constants and avoid a tendency to crystallize, these glasses are primarily optical glasses with a Tg of 550° C. or higher (see Japanese Unexamined Patent Publication (KOKAI) No. 2003-267748 and the English family member thereof, U.S. Patent Application 2003211929AA; Japanese Unexamined Patent Publication (KOKAI) Nos. 2002-012443 and 2004-099428 and the English language family members thereof, U.S. Patent Application 2004106507AA; Japanese Unexamined Patent Publication (KOKAI) No. 2005-247613 and the English language family member thereof, U.S. Patent Application 2005197243AA, the entire contents of which are hereby incorporated herein by reference).

The temperature of the heat treatment increases when subjecting an optical element comprised of a high-temperature glass material with a Tg of 550° C. or higher to a heat treatment to achieve a desired refractive index. Thus, not only does the time required for heating and cooling increase, compromising productivity, but in an optical element that is exposed to an elevated temperature for an extended period, there are problems in that components volatize from the surface and volatizing impurities in the furnace adsorb, forming an altered layer on the surface. Conversely, when the heat treatment is conducted at an excessively low temperature, there is inadequate adjustment of the refractive index.

Specifically, when an optical glass comprised of such a high-temperature glass material is preformed into a prescribed volume and shape to form a glass material, when the glass material is molded into a lens by precision mold pressing, and when annealing is then conducted to reduce the residual strain within the lens following mold release, cases of defective external appearance such as clouding and whitening have been observed in the lens surface. Annealing after mold release is conducted in order for removing strain and/or adjusting the refractive index, and is conducted in the vicinity of the Tg or within a suitable temperature range below the Tg. In a glass material in which the Tg is relatively high, the annealing temperature is also set high; for example, from (Tg−50° C.) to (Tg+20° C.). The temperature range is, for example, in the vicinity of 500 to 600° C.

Accordingly, the present invention has for its object to provide a method for manufacturing high-optical-performance mold-pressed lenses in which the defective external appearance of optical elements comprised of high-temperature glass materials with a Tg of 550° C. or higher is prevented.

DISCLOSURE OF THE INVENTION

The present inventors investigated why the above annealing caused clouding and contamination of the surface of the glass molded product. As a result, they discovered that during annealing, some of the components of the glass volatized from the surface of the glass molded product, producing clouding and contamination. They also discovered that an optical glass element free of defects in external appearance such as clouding and contamination and affording good optical performance was obtained by providing a covering portion of a second glass on the surface of the glass material to be press molded, press molding the glass material on which the covering portion had been provided, conducting annealing with the covering portion of the second glass in place, and removing the covering layer of the second glass after annealing. The present invention was devised on that basis.

The present invention is comprised of the following:

[1] A method for manufacturing an optical glass element, comprising:
annealing a press-molded product obtained by press molding into a lens shape a glass material comprised of a core portion comprised of an optical glass (the "first glass" hereinafter) with a transition temperature of 550° C. or higher and a covering portion comprised of a second glass covering the surface of said core portion; and then removing the covering layer from the surface of the press-molded product to obtain an optical glass element.

[2] The manufacturing method in accordance with [1], characterized in that said first glass has a refractive index nd of 1.7 or higher and an Abbé number v(nu)d of 25 or higher.
[3] The manufacturing method in accordance with [1] or [2], characterized in that said first glass is an optical glass comprising $B_2O_3$, ZnO, $La_2O_3$, and $ZrO_2$ in the form of a glass comprising, denoted as mol percentages, 0 (inclusive) to 15 percent of $Li_2O$, 20 to 50 percent of $B_2O_3$, 0 to 20 percent of $SiO_2$, 5 to 42 percent of ZnO, 5 to 24 percent of $La_2O_3$, 0 to 20 percent of $Gd_2O_3$ (where the total quantity of $La_2O_3$ and $Gd_2O_3$ is 10 to 24 percent), 0.5 to 10 percent of $ZrO_2$, 0 to 15 percent of $Ta_2O_5$, 0 to 20 percent of $WO_3$, 0 to 20 percent of $Nb_2O_5$, 0 to 20 percent of $TiO_2$, 0 to 10 percent of $Bi_2O_3$, 0 to 10 percent of $GeO_2$, 0 to 10 percent of $Ga_2O_3$, 0 to 10 percent of $Al_2O_3$, 0 to 10 percent of RO (R=Ca, Sr, Ba), 0 to 10 percent of $R'_2O$ (R'=Na, K), 0 to 10 percent of $Y_2O_3$, and 0 to 10 percent of $Yb_2O_3$ (glass Ia).
[4] The manufacturing method in accordance with [1] or [2], characterized in that said first glass is an optical glass comprising $B_2O_3$, $La_2O_3$, and ZnO in the form of a glass comprising, denoted as mol percentages, 20 to 60 percent of $B_2O_3$, 0 to 20 percent of $SiO_2$, 2 to 40 percent of ZnO, 5 to 24 percent of $La_2O_3$, 0 to 20 percent of $Gd_2O_3$ (where the total quantity of $La_2O_3$ and $Gd_2O_3$ is 10 to 24 percent), 0 to 10 percent of $ZrO_2$, 0 to 10 percent of $Ta_2O_5$, 0 to 10 percent of $WO_3$, 0 to 15 percent of $Nb_2O_5$, 0 to 10 percent of $TiO_2$, 0 to 10 percent of $Bi_2O_3$, 0 to 10 percent of $GeO_2$, 0 to 10 percent of $Ga_2O_3$, 0 to 10 percent of $Al_2O_3$, 0 to 10 percent of RO (R=Ca, Sr, Ba), 0 to 10 percent of $R'_2O$ (R'=Li, Na, K), 0 to 10 percent of $Y_2O_3$, and 0 to 10 percent of $Yb_2O_3$ (glass Ib).
[5] The manufacturing method in accordance with any one of [1] to [4], characterized in that the etching rate of said second glass by an acid or alkali treatment is greater than the etching rate of said first glass.
[6] The manufacturing method in accordance with [5], characterized in that the total content of $TiO_2$, $Nb_2O_5$, $WO_3$, and $Bi_2O_3$ in said second glass is 5 mol percent or less.
[7] The manufacturing method in accordance with [5] or [6], characterized in that said second glass comprises one or more from among $La_2O_3$, $Y_2O_3$, $Sc_2O_3$, $Gd_2O_3$, $Lu_2O_3$, $ZrO_2$, and $HfO_2$.
[8] The manufacturing method in accordance with any one of [1] to [7], wherein annealing of the press-molded product is conducted by raising the temperature of the press molded product to within (Tg−70° C.) to (Tg+20° C.), maintaining a constant temperature for a certain period, and when the prescribed period has expired, cooling said press-molded product.
[9] The manufacturing method in accordance with any one of [1] to [8] wherein the covering layer on the surface of the press-molded product is removed by a prescribed acid or alkali treatment.

The present invention produces an optical glass element of good external appearance and optical performance even from an optical glass with a glass transition temperature of 550° C. or higher. More particularly, the present invention produces an optical glass element of good external appearance and optical performance even from an optical glass with a glass transition temperature of 580° C. or higher.

BEST MODES OF CARRYING OUT THE INVENTION

The method for manufacturing an optical glass element of the present invention includes the obtaining of an optical glass element by annealing a press-molded product obtained by press molding into a lens shape a glass material having a core portion comprised of an optical glass (the first glass) with a transition temperature of 550° C. or greater and a covering portion comprised of a second glass covering the surface of the core portion, and then removing the covering layer on the surface of the press-molded product.
[The First Glass]
In the present invention, the first glass is an optical glass having a transition temperature of 550° C. or higher. In the manufacturing of an optical glass element, when annealing a press-molded product comprised of an optical glass having a transition temperature of 550° C. or higher, the annealing step tends to be conducted at high temperature and/or for an extended period. During this period, some of the glass components volatize from the surface of the glass molded product, tending to produce the above-mentioned clouding and contamination. This tendency is particularly strong in glass materials with high softening points with a Tg of 580° C. or higher and in glass materials with a Tg of 590° C. or higher. The present invention is particularly effective when it is necessary to conduct annealing to reduce the residual strain within a press-molded product comprised of an optical glass having such a high transition temperature.

The first glass, which has a transition temperature of 550° C. or higher, can be a high value-added glass of high refraction and low dispersion, such as a glass having a refractive index nd of 1.7 or higher and an Abbé number v(nu)d of 25 or higher.

An example of the first glass is a glass having a refractive index nd of 1.7 to 1.9 and an Abbé number v(nu)d of 25 to 60 (glass I).

Glass I includes (glass Ia) comprising 0 (inclusive) to 15 percent of $Li_2O$, 20 to 50 percent of $B_2O_3$, 0 to 20 percent of $SiO_2$, 5 to 42 percent of ZnO, 5 to 24 percent of $La_2O_3$, 0 to 20 percent of $Gd_2O_3$ (where the total quantity of $La_2O_3$ and $Gd_2O_3$ is 10 to 24 percent), 0.5 to 10 percent of $ZrO_2$, 0 to 15 percent of $Ta_2O_5$, 0 to 20 percent of $WO_3$, 0 to 20 percent of $Nb_2O_5$, 0 to 20 percent of $TiO_2$, 0 to 10 percent of $Bi_2O_3$, 0 to 10 percent of $GeO_2$, 0 to 10 percent of $Ga_2O_3$, 0 to 10 percent of $Al_2O_3$, 0 to 10 percent of RO (R=Ca, Sr, Ba), 0 to 10 percent of $R'_2O$ (R'=Na, K), 0 to 10 percent of $Y_2O_3$, and 0 to 10 percent of $Yb_2O_3$. Further examples are the above glass further having an Abbé number (v(nu)d) of 35 or greater but less than 40, preferably a refractive index nd of 1.86 or higher. Table I gives specific examples of the glass composition of glass Ia.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Glass | $B_2O_3$ | 37.39 | 35.20 | 33.05 | 31.02 | 39.03 | 40.17 | 39.67 | 39.67 | 39.68 | 36.80 |
| composition | $SiO_2$ | 9.76 | 12.80 | 15.75 | 18.60 | 6.50 | 6.69 | 6.61 | 6.61 | 6.61 | 6.40 |
| (mol %) | $Li_2O$ | 6.50 | 6.40 | 6.30 | 6.20 | 6.50 | 6.69 | 6.61 | 6.61 | 6.61 | 4.80 |
| | ZnO | 13.01 | 12.80 | 12.60 | 12.40 | 13.01 | 13.39 | 13.22 | 13.22 | 13.22 | 19.20 |

TABLE 1-continued

|  |  |  |  |  |  |  |  |  |  |
|---|---|---|---|---|---|---|---|---|---|
| $La_2O_3$ | 16.26 | 16.00 | 15.75 | 15.50 | 14.63 | 16.74 | 14.88 | 13.22 | 11.57 | 14.40 |
| $Gd_2O_3$ | | | | | | | | | | |
| $ZrO_2$ | 4.88 | 4.80 | 4.72 | 4.65 | 4.88 | 5.02 | 4.96 | 4.96 | 4.96 | 4.80 |
| $Ta_2O_5$ | | | | | | | | | | |
| $WO_3$ | 4.88 | 4.80 | 4.75 | 4.65 | 4.88 | 2.51 | 4.96 | 4.96 | 4.96 | 4.80 |
| $Nb_2O_5$ | 2.44 | 2.40 | 2.36 | 2.33 | 2.44 | 3.77 | 2.48 | 2.48 | 2.47 | 4.00 |
| $TiO_2$ | 4.88 | 4.80 | 4.72 | 4.65 | 8.13 | 5.02 | 4.96 | 4.96 | 4.96 | 4.80 |
| $Y_2O_3$ | | | | | | | 1.65 | 3.31 | 4.96 | |
| Total | 100 | 100 | 100 | 100 | 100 | 100 | 100 | 100 | 100 | 100 |
| Refractive index (nd) | 1.831 | 1.827 | 1.823 | 1.82 | 1.841 | 1.838 | 1.831 | 1.827 | 1.823 | 1.85 |
| Abbé no. ($\nu d$) | 38.06 | 38.12 | 38.24 | 38.34 | 35.78 | 37.63 | 38.09 | 38.15 | 38.26 | 35.82 |
| Glass transition temperature (° C.) | 550 | 557 | 559 | 552 | 553 | 551 | 551 | 554 | 559 | 554 |

| | | Example | | | | | | | | |
|---|---|---|---|---|---|---|---|---|---|---|
| | | 12 | 12 | 13 | 14 | 15 | 16 | 17 | 18 | 19 | 20 |
| Glass composition (mol %) | $B_2O_3$ | 34.89 | 36.43 | 34.89 | 33.33 | 31.79 | 34.35 | 32.82 | 33.83 | 33.83 | 32.32 |
| | $SiO_2$ | | | | | | 3.05 | 3.05 | 3.01 | 3.01 | 6.02 |
| | $Li_2O$ | | | | | | | 1.53 | | | 1.50 |
| | ZnO | 32.56 | 23.26 | 32.56 | 32.56 | 32.56 | 22.90 | 22.90 | 25.56 | 22.56 | 19.55 |
| | $La_2O_3$ | 13.95 | 13.18 | 10.85 | 10.85 | 10.85 | 10.69 | 10.69 | 12.04 | 10.53 | 10.53 |
| | $Gd_2O_3$ | 3.10 | 2.33 | 6.20 | 7.76 | 9.30 | 4.58 | 4.58 | 3.01 | 4.51 | 6.02 |
| | $ZrO_2$ | | | | | | | | 3.05 | 3.01 | |
| | $Ta_2O_5$ | | | | | | 1.53 | 1.53 | 1.50 | 1.50 | |
| | $WO_3$ | 9.30 | 9.30 | 9.30 | 9.30 | 9.30 | 9.16 | 9.16 | 9.02 | 9.02 | 9.02 |
| | $Nb_2O_5$ | 3.10 | 3.10 | 3.10 | 3.10 | 3.10 | 1.53 | 1.53 | | | |
| | $TiO_2$ | 3.10 | 12.40 | 3.10 | 3.10 | 3.10 | 12.21 | 9.16 | 9.02 | 15.04 | 15.04 |
| | $Y_2O_3$ | | | | | | | | | | |
| Total | | 100 | 100 | 100 | 100 | 100 | 100 | 100 | 100 | 100 | 100 |
| Refractive index (nd) | | 1.874 | 1.898 | 1.871 | 1.882 | 1.893 | 1.902 | 1.893 | 1.878 | 1.894 | 1.884 |
| Abbé no. ($\nu d$) | | 34.90 | 29.20 | 34.60 | 34.00 | 33.40 | 31.10 | 32.50 | 33.70 | 31.10 | 32.00 |
| Glass transition temperature (° C.) | | 570 | 591 | 567 | 567 | 567 | 590 | 588 | 585 | 595 | 597 |

A further example of glass I is (glass Ib), an optical glass comprising $B_2O_3$, $La_2O_3$, and ZnO in the form of a glass comprising, denoted as mol percentages, 20 to 60 percent of $B_2O_3$, 0 to 20 percent of $SiO_2$, 2 to 40 percent of ZnO, 5 to 24 percent of $La_2O_3$, 0 to 20 percent of $Gd_2O_3$ (where the total quantity of $La_2O_3$ and $Gd_2O_3$ is 10 to 24 percent), 0 to 10 percent of $ZrO_2$, 0 to 10 percent of $Ta_2O_5$, 0 to 10 percent of $WO_3$, 0 to 15 percent of $Nb_2O_5$, 0 to 10 percent of $TiO_2$, 0 to 10 percent of $Bi_2O_3$, 0 to 10 percent of $GeO_2$, 0 to 10 percent of $Ga_2O_3$, 0 to 10 percent of $Al_2O_3$, 0 to 10 percent of RO (R=Ca, Sr, Ba), 0 to 10 percent of $R'_2O$ (R'=Li, Na, K), 0 to 10 percent of $Y_2O_3$, and 0 to 10 percent of $Yb_2O_3$. A further example is an optical glass with the above composition in which the lithium content is less than 0.5 mol percent (including zero) as converted to $Li_2O$, with an Abbé number of 40 or higher. A still further example is an optical glass having a refractive index of nd of 1.79 or higher. Table 2 shows specific examples of the glass composition of glass Ib.

TABLE 2

| | | Example | | | | | | | | | |
|---|---|---|---|---|---|---|---|---|---|---|---|
| | | 21 | 22 | 23 | 24 | 25 | 26 | 27 | 28 | 29 | 30 |
| Glass composition (mol %) | $B_2O_3$ | 32.28 | 35.48 | 33.86 | 30.28 | 31.62 | 35.92 | 34.35 | 31.34 | 42.61 | 37.50 |
| | $SiO_2$ | 9.45 | 9.68 | 9.45 | 9.56 | 9.49 | 3.13 | 6.11 | 5.97 | 3.28 | |
| | $Li_2O$ | 3.94 | 4.03 | 3.94 | 5.58 | 5.53 | | | | | |
| | ZnO | 28.35 | 24.19 | 28.35 | 22.31 | 23.72 | 34.38 | 38.17 | 41.79 | 26.23 | 35.92 |
| | $La_2O_3$ | 9.06 | 9.27 | 7.87 | 10.36 | 9.49 | 11.72 | 11.45 | 11.19 | 12.30 | 11.72 |
| | $Gd_2O_3$ | 9.06 | 9.27 | 7.87 | 10.36 | 9.49 | 5.47 | 3.82 | 3.73 | 5.74 | 3.91 |
| | $ZrO_2$ | 4.72 | 4.84 | 4.72 | 3.98 | 3.95 | 4.69 | 3.05 | 2.99 | 3.28 | 3.13 |
| | $Ta_2O_5$ | 3.15 | 3.23 | 3.15 | 2.79 | 1.98 | 3.13 | 3.05 | 2.99 | 3.28 | 3.13 |
| | $WO_3$ | | | | 4.78 | 4.74 | 1.56 | | | 3.28 | 4.69 |
| | $Nb_2O_5$ | | | | 0.79 | | | | | | |
| | $Al_2O_3$ | | | | | | | | | | |
| Total | | 100 | 100 | 100 | 100 | 100 | 100 | 100 | 100 | 100 | 100 |

TABLE 2-continued

| | | | | | | | | | | |
|---|---|---|---|---|---|---|---|---|---|---|
| Refractive index (nd) | 1.818 | 1.81 | 1.81 | 1.842 | 1.825 | 1.831 | 1.81 | 1.817 | 1.818 | 1.837 |
| Abbé no. (ν(nu)d) | 43.95 | 44.51 | 43.26 | 40.85 | 41.79 | 42.10 | 43.60 | 42.90 | 42.60 | 40.10 |
| Glass transition temperature (° C.) | 566 | 573 | 556 | 565 | 556 | 587 | 579 | 570 | 604 | 577 |

| | | Example | | | | | | | | | |
|---|---|---|---|---|---|---|---|---|---|---|---|
| | | 31 | 32 | 33 | 34 | 35 | 36 | 37 | 38 | 39 | 40 |
| Glass composition (mol %) | $B_2O_3$ | 55.00 | 55.00 | 52.50 | 52.50 | 52.50 | 36.80 | 34.65 | 37.10 | 36.80 | 37.10 |
| | $SiO_2$ | | | | | | 12.80 | 15.75 | 12.90 | 12.80 | 12.90 |
| | $Li_2O$ | | | | | | 5.60 | 5.51 | 5.65 | 5.60 | 5.65 |
| | ZnO | 17.50 | 17.50 | 20.00 | 20.00 | 20.00 | 22.40 | 22.05 | 22.58 | 22.40 | 22.58 |
| | $La_2O_3$ | 11.00 | 12.50 | 12.50 | 12.50 | 12.50 | 8.00 | 7.87 | 8.06 | 8.00 | 8.87 |
| | $Gd_2O_3$ | 5.00 | 7.50 | 7.50 | 6.50 | 4.50 | 8.00 | 7.87 | 8.06 | 8.00 | 7.26 |
| | $ZrO_2$ | 5.00 | 5.00 | 5.00 | 5.00 | 5.00 | 4.80 | 4.72 | 3.23 | 3.20 | 3.23 |
| | $Ta_2O_5$ | 0.00 | 0.00 | 0.00 | 1.00 | 3.00 | 1.60 | 1.57 | 2.42 | 1.60 | 2.42 |
| | $WO_3$ | | | | | | | | | 1.60 | |
| | $Nb_2O_5$ | | | | | | | | | | |
| | $Al_2O_3$ | 6.50 | 2.50 | 2.50 | 2.50 | 2.50 | | | | | |
| | Total | 100 | 100 | 100 | 100 | 100 | 100 | 100 | 100 | 100 | 100 |
| Refractive index (nd) | | 1.726 | 1.756 | 1.763 | 1.766 | 1.771 | 1.774 | 1.771 | 1.774 | 1.774 | 1.775 |
| Abbé no. (ν(nu)d) | | 51.44 | 50.49 | 49.96 | 49.24 | 47.29 | 47.25 | 47.27 | 46.90 | 46.34 | 46.81 |
| Glass transition temperature (° C.) | | 623 | 623 | 614.4 | 613.2 | 617 | 609 | 608 | 607 | 606 | 607 |

In the manufacturing method of the present invention, a glass material having a core portion comprised of a first glass and a covering portion comprised of a second glass covering the surface of the core portion is employed. This glass material is obtained by forming a glass material (core portion) comprised of the first glass and forming the covering portion thereover. The glass material (core portion) comprised of the first glass can be preformed by cold processing such as cutting and polishing of the above optical glass, or can be hot preformed by dripping or flowing a melt onto a receiving mold. A surface without defects is desirably and efficiently obtained by obtaining a spherical or biconvex surface shape by hot forming.

In the present invention, a glass material obtained by covering a first glass affording the desired optical performance of the final optical element with a second glass is press molded to obtain a press-molded product, which is annealed to lower the residual strain within the press-molded product or adjust the refractive index thereof. A covering portion is provided to protect the first glass so that an altered layer does not form on the surface of the first glass when exposed to an elevated temperature for an extended period during annealing. This covering portion is comprised of the second glass, described below, and is removed by a prescribed process following annealing of the press-molded product.

The covering portion comprised of the second glass is to be capable of following the first glass as the first glass is deformed and made to spread into a desired shape by pressure during pressing, essentially covering the first glass until the completion of press molding. Thus, a glass material that shares or approximates the physical characteristics of the core portion in a hot environment is suitably employed as the material of the covering portion. The covering portion desirably covers the entire area of the first glass, covering at a minimum the area of the effective diameter of the optical element obtained.

The covering portion comprised of the second glass is desirably a glass material with a property permitting ready removal by a prescribed process. For example, the covering portion can be removed after annealing the press-molded product by imparting a greater etching rate to the second glass than the first glass and conducting etching by a prescribed acid or alkali treatment.

The prescribed acid or alkali treatment is conducted as follows.

The acid treatment in the present invention is a treatment in which an acidic aqueous solution is employed to remove the covering portion from the press-molded product. The alkali treatment is a treatment in which an alkaline aqueous solution is employed to remove the covering portion from the press-molded product. The acidic aqueous solution is an aqueous solution of at least one member selected from the group consisting of sulfuric acid, nitric acid, hydrochloric acid, acetic acid, phosphoric acid, hydrofluoric acid, sulfamic acid, tartaric acid, citric acid, gluconic acid, malonic acid, and oxalic acid. The alkaline aqueous solution is an alkali hydroxide solution such as sodium hydroxide or potassium hydroxide.

In the course of removing the covering portion by an acid or alkali treatment following press molding, a second glass in the form of a glass having lower chemical resistance, such as acid resistance or alkali resistance, than the first glass can be employed. The ratio of the etching rate of the second glass to that of the first glass during chemical processing (acid or alkali treatment) is desirably raised in this manner. Denoting the etching rate of the first glass as R1 and that of the second glass as R2, and defining the ratio thereof Re as R2/R1, log Re is 2 or greater, desirably 2.5 or greater, preferably 3 or greater, more preferably 3.5 or greater, even more preferably 4 or greater, still more preferably 4.5 or greater, even more preferably 5 or greater, still more preferably 6 or greater, and yet even more preferably R1=0.

The etching rate (D1) of the glass film material (second glass) and the etching rate (D2) of the glass core material (first class) satisfy D1>D2, it being desirable for D1=0.01 to 0.50 and D2=0.000 to 0.05. It is further desirable for D1>10×D2.

Glass etching rates D1 and D2 can be defined as the average weight reduction rate per unit time (weight percent/minute) when the glass is immersed for a prescribed period in an acid or alkali solution of prescribed concentration and temperature.

No shape is specified in the description given below for the materials employed in the present invention. However, for example, in the calculation of the average weight reduction rate per unit time in the present invention, a glass block of the same composition as the film material with a volume of 100 to 1,000 m$^3$ and a surface area of 100 to 1,000 mm$^2$ is immersed in 50° C. 0.1N HNO$_3$, and the weight reduction rate per minute when the immersion time is varied is calculated as:

(weight of glass before immersion−weight of glass after immersion)/(weight of glass before immersion)/immersion time (min)×100(%), the average value of the weight reduction ratio D(t) (t=10, 15, 20, 25) for immersion time t (min) is calculated, and this value is adopted as the average weight reduction rate per unit time for immersion times of 10 to 25 minutes.

Further, to shorten the etching time, the absolute value of the volume reduction rate of the second glass is desirably high. For example, the volume reduction rate of the second glass when immersed in 50° C. 0.1N HNO$_3$ is desirably 0.01 percent/minute or higher, preferably 0.02 percent/minute or higher, more preferably 0.04 percent/minute or higher, still more preferably 0.08 percent/minute or higher, even more preferably 0.10 percent/minute or higher, and yet even more preferably, 0.12 percent/minute or higher.

The acid, alkali, or the like employed in etching is not specifically limited. Nor is the type or concentration of the etching solution specifically limited. Nitric acid, hydrochloric acid, sulfuric acid, acetic acid, phosphoric acid, an aqueous solution of sodium hydroxide or potassium hydroxide, or the like can be suitably diluted for use as a 0.1N to 0.0001 N aqueous solution, or a commercial mixed acid, mixed alkali, cleaning solution, or the like can be employed based on the objective. In this process, the concentration is desirably adjusted to a degree that does not etch the first glass. Nitric acid, hydrochloric acid, sodium hydroxide, and the like, which do not cause salts to precipitate out due to the reaction with glass components, are particularly desirable. Buffer solutions, chelating agents, and the like can be added to the etching solution to the extent that the object of the present invention is not lost.

In the present invention, it is appropriate to employ a multicomponent glass as the second glass, in the same manner as for the first glass. The multicomponent glass is not a compound comprised of a single bond between different atoms, such as in quartz glass, but a composite comprised of an accumulation of two or more bonds between different atoms, containing multiple cations and/or anions.

The cationic component of the multicomponent glass is not specifically limited. However, conventional metal elements such as alkali metals, alkaline earth metals, boron, and aluminum can be incorporated to the extent that the object of the present invention is not lost. Transition metal elements, excluding the above-described readily reducible components, can also be incorporated, to the extent that the object of the present invention is not lost, in applications of the first glass and combinations of the first and second glasses to optical elements. The anionic component of the multicomponent system is not specifically limited; oxygen, sulfur, fluorine, chlorine, and the like can be incorporated.

Specific examples of the second glass are given below. Readily reducible components comprised of W, Ti, Bi, and Nb are desirably either not incorporated in the second glass at all, or the total content of the oxides TiO$_2$, Nb$_2$O$_5$, WO$_3$, and Bi$_2$O$_3$, which readily create oxygen vacancies, is 5 mol percent or lower.

One or more oxides that have a relative tendency not to create oxygen vacancies selected from the group consisting of La$_2$O$_3$, Y$_2$O$_3$, Sc$_2$O$_3$, Gd$_2$O$_3$, Lu$_2$O$_3$, ZrO$_2$, and HfO$_2$ are desirably incorporated into the second glass.

Multicomponent glasses suited to the second glass of the present invention include glasses in which, for example, SiO$_2$, P$_2$O$_5$, B$_2$O$_3$, Al$_2$O$_3$, GeO$_2$, and Ga$_2$O$_3$ are incorporated as glass formers. Further, the glass may have a transition temperature Tg falling within a range of 400 to 750° C.

Examples of multicomponent glasses employed as the second glass are the glasses described in Embodiment 1 to 14 (Table 4) further below. These glasses share characteristics (1) and (2) below:
(1) a low content (5 mol percent or less) of oxides readily creating oxygen vacancies, such as TiO$_2$, Nb$_2$O$_5$, WO$_3$, and Bi$_2$O$_3$; and
(2) no PbO content.

Further examples of the second glass are the glasses of Embodiments 15 to 39 (Table 5) described further below. These glasses share characteristics (1) and (2) below:
(1) a low content (5 mol percent or less) of oxides readily creating oxygen vacancies, such as TiO$_2$, Nb$_2$O$_5$, WO$_3$, and Bi$_2$O$_3$; and
(2) low acid resistance (undergoing etching more readily than the core glass):
   containing an essential component in the form of phosphoric acid and/or boric acid with lower water resistance as a simple substance;
   containing an optional component in the form of an alkaline earth element and/or alkali element to adjust the softening temperature (Tg);
   containing optional components in the form of SiO$_2$ and Al$_2$O$_3$ to adjust an excessively low acid resistance and enhance the thermal stability of the glass; and/or
   containing optional components in the form of oxides that do not readily create oxygen vacancies, such as La$_2$O$_3$, Y$_2$O$_3$, Sc$_2$O$_3$, Gd$_2$O$_3$, Lu$_2$O$_3$, ZrO$_2$, and HfO$_2$.

The glasses of Embodiments 15 to 39 below given by way of example can be classified as set forth below:

TABLE 3

| Category | Embodiment | Common characteristics |
|---|---|---|
| Group A | 15-19 | Phosphate glasses of various phosphate-boron ratios. |
| Group B-1 | 20-24 28-31 | Readily acid-soluble B—Si—Ba glasses of various B$_2$O$_3$—SiO$_2$ quantities. |
| Group B-2 | 25-27 | B—Si—Ba glasses into which various alkali components (Li, Na, K) are introduced based on a basic glass composition (Embodiment 32). |
| Group B-3 | 32-36 | B—Si—Ba glasses into which various alkaline earth components (Mg, Ca, Sr, Zn) are introduced based on a basic glass composition (Embodiment 32). |
| Group C | 37-39 | Glasses of various Tg tending not to dissolve in acids. |

The covering portion comprised of the second glass can be formed by a known method of application on the glass material (core portion) comprised of the first glass. A film-forming method such as sputtering or vacuum deposition can be employed as the application method. For example, a covering layer of the second glass is desirably formed by argon gas sputtering with the second glass as target.

When the film is excessively thick, as the core portion glass deforms and extends during press molding of the glass material, the covering portion is unable to follow and cracking tends to occur. When the film is too thin, a portion of the surface of the glass material is exposed, which tends to react with the pressing mold. The thickness range of the film is desirably 0.1 to 1,000 nm, preferably 0.1 to 500 nm, and more preferably, 2 to 100 nm. It is desirable for the covering portion to completely cover the core portion.

[The Press Molding Step]

A glass material comprising a core portion comprised of the first glass and a covering portion comprised of the second glass covering the surface of the core portion is subjected to a press molding step. The press molding step can be implemented by the usual methods.

The press molding method will be described. A pressing mold having adequate thermal resistance and rigidity made of a dense material that has been precisely processed can be employed in press molding. Examples are pressing molds of silicon carbide, silicon nitride, tungsten carbide, aluminum oxide, titanium carbide, and metals such as stainless steel; as well as such pressing molds the surfaces of which have been coated with films of carbon, heat-resistant metals, noble metal alloys, carbides, nitrides, or borides.

The film coating the pressing surface desirably contains carbon. A carbon-containing film comprised of a single component layer or mixed layer of amorphous or crystalline graphite and/or diamond is desirably employed. The carbon film can be formed by means such as sputtering, plasma CVD, CVD, or ion plating. For example, the film can be formed by sputtering employing an inert gas such as Ar as the sputtering gas and graphite as the sputtering target. Alternatively, microwave plasma CVD can be used to form a film employing methane gas and hydrogen gas as starting material gases. When forming the film by ion plating, ionization can be conducted with benzene gas. These carbon films include films having C—H bonds.

Press molding can be conducted by the following method, for example.

In press molding, a pressing mold (comprising an upper mold, lower mold, and sleeve mold) and a glass material are heated to within a temperature range suited to pressing. For example, press molding is desirably conducted with the glass material and pressing mold in a temperature range at which the viscosity of the glass material is $10^5$ to $10^{10}$ dPa·s. The glass material can be introduced into the pressing mold and both the glass material and pressing mold heated to within the above-stated temperature range, or the glass material and pressing mold can be separately heated to within the above-stated temperature range prior to positioning the glass material within the pressing mold. Further, a step can be employed in which the glass material is heated to a temperature corresponding to a viscosity of $10^5$ to $10^9$ dPa·s, the pressing mold is separately heated to a temperature corresponding to a glass viscosity of $10^9$ to $10^{12}$ dPa·s, the glass material is positioned within the pressing mold, and press molding is immediately conducted. In that case, since the temperature of the pressing mold can be kept relatively low, desirable effects are achieved in that the heating/cooling cycle of the molding machine can be shortened and deterioration due to heating of the pressing mold can be inhibited. In either case, cooling begins when press molding begins, or after it has begun. While applying a suitable load schedule and maintaining tight contact between the pressing surface and the glass element, the temperature is lowered. Subsequently, the mold is released and the molded product is removed. The mold release temperature desirably corresponds to a viscosity of $10^{12.5}$ to $10^{13.5}$.

[The Annealing Step]

In the present invention, an annealing step, in which the molded product that has been removed from the pressing mold is reheated and recooled, is necessary following the press molding step. Since annealing of multiple molded products can be simultaneously conducted in the present invention, the molding cycle time is unaffected and there is little effect on productivity. In the present invention, annealing is a step in which residual strain within the glass is reduced by reheating and recooling. During this step, the refractive index changes, approaching the refractive index required of the desired optical element. That is, in the present invention, annealing is a step in which the residual strain within the glass is reduced or similteneously the refractive index is adjusted by heat treatment followed by cooling.

A number (for example, 100 to 1,000) of the molded products obtained by the above-described press-molding step is placed in a heating furnace for annealing. The atmosphere within the heating furnace is not specifically limited, but desirably has an oxygen concentration of 0 to 5 volume percent to avoid oxidation of the material constituting the furnace and resulting lens contamination.

In the course of reheating, the furnace within which the molded product has been placed heats at a rate of temperature increase of 60 to 300° C./hour, for example. Subsequently, for example, the interior of the furnace is maintained for a prescribed period at (Tg−70° C.) to (Tg+20° C.), desirably (Tg−50° C.) to (Tg+20° C.), preferably (Tg−60° C.) to (Tg−20° C.), and more preferably, (Tg−50° C.) to (Tg−20° C.). This allows good maintenance of shape precision in the molded product. The rise in temperature from the film-removing temperature to the annealing temperature desirably takes place over an hour or more. The rate of the rise in temperature during this period is suitably 60 to 300° C./hour, as stated above. By way of example, the annealing temperature can be maintained for 0.5 to 6 hours, desirably 2 to 4 hours.

The rate of temperature drop from the annealing temperature is 100° C./hour or less, desirably 80° C./hour or less. The above maintenance temperature and rate of temperature drop can be selected so that residual strain in the optical element obtained becomes 0.01 to 60 nm as birefringence in the direction of the optical axis over the entire area of the effective optical diameter. More preferably, it is conducted so that it becomes 0.01 to 20 nm. The rate of temperature drop from the annealing temperature is preferably selected so that the residual strain of the optical element obtained becomes 10 nm or less as birefringence. Most preferably, it is conducted so that it becomes 1 nm or less. For example, this rate is 60° C./hour or less, preferably 20 to 60° C./hour.

So long as the temperature of the glass is adequately cooled, reaching around Tg−180° C., for example, the glass can be rapidly cooled within a range at which the glass does not crack. For example, the above cooling can be conducted at 100° C./hour or higher. Once the temperature has reached room temperature or a temperature below about 100° C. in this manner, the molded product can be removed from the furnace.

The providing of an annealing step is known in the course of manufacturing an optical glass element. In this step, the optical glass element that has been molded is subjected to a certain heat treatment, primarily to remove strain and adjust the refractive index. This adjustment of the refractive index is effective for obtaining an optical glass element having a uniform desired refractive index.

The present invention is particularly effective for mold pressing lenses with optical glasses of relatively high Tg (that is, with a relatively high annealing temperature).

[The Step of Removing the Covering Layer]

After the annealing step, the covering layer is removed from the surface of the press-molded product. Either a physical or chemical method of removal can be employed. A method based on abrasive cloth can be employed for physical removal. Etching can be employed as a chemical removal method. To remove the coating film by etching, as set forth above, it is desirable to select a second glass having a higher acid or alkali etching rate than the first glass.

The etching step can be conducted in the order of, for example, etching, rinsing, and drying. For example, a molded product that has been obtained by press molding can be set in a jig or the like, immersed for a prescribed period (10 to 300 seconds, for example) in a vessel containing etching solution, and once the covering portion has been removed, immersed in a vessel containing water to remove the etching solution from the surface of the molded product. The water can then be removed from the surface of the molded product in a drier to obtain a dried molded product. Following any of these steps, a cleaning step can be used to increase the cleanliness of the surface of the molded product. However, from the perspective of increasing the cleanliness of the surface of the molded product, the molded product is desirably subjected to a lens cleaning step prior to the drying step.

Neither the type nor concentration of the etching solution is specifically limited. Nitric acid, hydrochloric acid, sulfuric acid, a mixture of two or more of the same, an aqueous solution of sodium hydroxide or potassium hydroxide, or the like can be suitably diluted for use as a 0.0001 N to 1 N aqueous solution, or a commercial mixed acid, mixed alkali, cleaning solution, or the like can be employed based on the objective.

The etching step is desirably conducted after subjecting the molded product obtained by press molding to an annealing and/or centering and edging step.

Neither the use nor the shape of the optical element of the present invention is limited. Specifically, it can be employed as the lenses constituting image pickup apparatuses, optical pickup lenses, collimator lenses, and the like. The optical element may have a biconvex, biconcave, or meniscus shape. However, the present invention is advantageously applied to the molding of concave meniscus lenses and biconcave lenses because the volume of the glass within the effective optical diameter is relatively small and strain in the direction of the optical axis within this range can be reduced with relative ease by press molding. The present invention is particularly suitable for lenses in which the thickness within the effective optical diameter is 1 mm or less.

[Embodiments]

The present invention is described in greater detail through embodiments below.

Convex meniscus glass lenses 16 mm in diameter were press molded using optical glass A (containing a combined 48 mol percent of $B_2O_3$ and $SiO_2$ as network forming components, Tg=557° C., nd=1.827, v(nu)d=38.12) of Example 2 in Table 1 above as the first glass.

First, a melt of optical glass A was dripped into a receiving mold, cooled, and flattened from a spherical shape to preform a biconvex glass gob. Next, sputtering was conducted using a target in the form of one of the multicomponent glasses B of Embodiments 1 to 39 indicated in Tables 4 and 5 to form a covering portion 13 nm in thickness on the surface of the above preformed glass gob. This yielded glass materials for mold pressing having covering portions covering the surface of the core portions of Embodiments 1 to 39.

TABLE 4

| | | $B_2O_3$ | $SiO_2$ | $Al_2O_3$ | $Li_2O$ | $Na_2O$ | $K_2O$ | MgO | CaO | SrO | BaO | ZnO |
|---|---|---|---|---|---|---|---|---|---|---|---|---|
| Embodiment 1 | mol % | 56.1 | 8.7 | 0.5 | 0.0 | 0.0 | 0.0 | 0.0 | 20.3 | 0.0 | 0.0 | 0.0 |
| Embodiment 2 | mol % | 41.0 | 26.0 | 1.3 | 0.0 | 0.0 | 0.0 | 0.0 | 0.0 | 0.0 | 25.2 | 0.0 |
| Embodiment 3 | mol % | 18.3 | 55.1 | 4.2 | 0.0 | 0.0 | 0.0 | 0.0 | 0.0 | 0.0 | 22.4 | 0.0 |
| Embodiment 4 | mol % | 23.4 | 46.6 | 1.2 | 0.0 | 0.0 | 0.0 | 0.0 | 0.0 | 0.0 | 28.8 | 0.0 |
| Embodiment 5 | mol % | 19.5 | 45.3 | 0.9 | 0.0 | 0.0 | 0.0 | 0.0 | 1.6 | 0.0 | 28.9 | 2.0 |
| Embodiment 6 | mol % | 8.6 | 53.1 | 2.2 | 23.2 | 0.0 | 1.1 | 0.0 | 0.0 | 0.0 | 8.1 | 3.2 |
| Embodiment 7 | mol % | 9.4 | 74.4 | 0.0 | 0.0 | 9.2 | 5.8 | 0.0 | 0.0 | 0.0 | 1.2 | 0.0 |
| Embodiment 8 | mol % | 6.0 | 76.7 | 0.0 | 0.0 | 5.4 | 9.5 | 0.0 | 2.3 | 0.0 | 0.0 | 0.0 |
| Embodiment 9 | mol % | 2.9 | 74.3 | 0.0 | 0.0 | 5.8 | 11.1 | 0.0 | 0.0 | 0.0 | 4.3 | 1.7 |
| Embodiment 10 | mol % | 6.9 | 63.5 | 0.0 | 0.0 | 1.1 | 11.6 | 0.0 | 0.0 | 0.0 | 0.0 | 16.8 |
| Embodiment 11 | mol % | 11.2 | 69.3 | 2.5 | 0.0 | 8.1 | 0.0 | 0.0 | 0.0 | 0.0 | 0.0 | 8.8 |
| Embodiment 12 | mol % | 19.6 | 47.9 | 3.5 | 12.0 | 0.0 | 0.0 | 3.6 | 1.3 | 0.0 | 11.0 | 0.0 |
| Embodiment 13 | mol % | 6.5 | 45.1 | 2.3 | 10.1 | 0.0 | 0.0 | 0.0 | 8.6 | 7.5 | 8.5 | 5.0 |
| Embodiment 14 | mol % | 52.5 | 0.0 | 2.5 | 0.0 | 0.0 | 0.0 | 0.0 | 0.0 | 0.0 | 0.0 | 20.0 |

| | | $La_2O_3$ | $Gd_2O_3$ | $Y_2O_3$ | $ZrO_2$ | $Ta_2O_5$ | $TiO_2$ | Total | $Tg_{TMA}$ (° C.) | Ts (° C.) | α100-300 (1/K) | FA |
|---|---|---|---|---|---|---|---|---|---|---|---|---|
| Embodiment 1 | mol % | 9.9 | 0.0 | 0.0 | 4.5 | 0.00 | 0.00 | 100.0 | 645 | 680 | 71 | 70 |
| Embodiment 2 | mol % | 6.5 | 0.0 | 0.0 | 0.0 | 0.00 | 0.00 | 100.0 | 625 | 655 | 84 | 130 |
| Embodiment 3 | mol % | 0.0 | 0.0 | 0.0 | 0.0 | 0.00 | 0.00 | 100.0 | 650 | 690 | 63 | 110 |
| Embodiment 4 | mol % | 0.0 | 0.0 | 0.0 | 0.0 | 0.00 | 0.00 | 100.0 | 660 | 685 | 71 | 130 |
| Embodiment 5 | mol % | 0.0 | 0.0 | 0.0 | 0.0 | 0.00 | 1.70 | 100.0 | 625 | 670 | 74 | 150 |
| Embodiment 6 | mol % | 0.4 | 0.0 | 0.0 | 0.0 | 0.00 | 0.00 | 100.0 | 474 | 517 | 104 | 110 |
| Embodiment 7 | mol % | 0.0 | 0.0 | 0.0 | 0.0 | 0.00 | 0.00 | 100.0 | 565 | 625 | 89 | 100 |
| Embodiment 8 | mol % | 0.0 | 0.0 | 0.0 | 0.0 | 0.00 | 0.00 | 100.0 | 550 | 615 | 90 | 110 |

TABLE 4-continued

| | | | | | | | | | Total | Tg-TMA (° C.) | Ts (° C.) | α100-300 (1/K) | DHNO3 |
|---|---|---|---|---|---|---|---|---|---|---|---|---|---|
| Embodiment 9 | mol % | 0.0 | 0.0 | 0.0 | 0.0 | 0.00 | 0.00 | 100.0 | 505 | 550 | 105 | 120 |
| Embodiment 10 | mol % | 0.0 | 0.0 | 0.0 | 0.0 | 0.00 | 0.00 | 100.0 | 560 | 625 | 91 | 120 |
| Embodiment 11 | mol % | 0.0 | 0.0 | 0.0 | 0.0 | 0.00 | 0.00 | 100.0 | 525 | 595 | 54 | 100 |
| Embodiment 12 | mol % | 1.0 | 0.0 | 0.0 | 0.0 | 0.00 | 0.00 | 100.0 | 540 | 585 | 89 | 100 |
| Embodiment 13 | mol % | 1.8 | 0.0 | 0.0 | 3.1 | 0.00 | 1.55 | 100.0 | 548 | 595 | 84 | 160 |
| Embodiment 14 | mol % | 12.5 | 7.5 | 0.0 | 5.0 | 0.00 | 0.00 | 100.0 | 614 | 653 | 67 | 60 |

TABLE 5

| | | $P_2O_5$ | $B_2O_3$ | $SiO_2$ | $Al_2O_3$ | $Li_2O$ | $Na_2O$ | $K_2O$ | MgO | CaO | SrO | BaO |
|---|---|---|---|---|---|---|---|---|---|---|---|---|
| Embodiment 15 | mol % | 30.0 | 6.5 | 0.0 | 3.5 | 13.0 | 0.0 | 0.0 | 15.0 | 15.0 | 0.0 | 15.0 |
| Embodiment 16 | mol % | 27.5 | 20.0 | 0.0 | 2.5 | 10.0 | 2.5 | 2.5 | 17.5 | 12.5 | 2.5 | 2.5 |
| Embodiment 17 | mol % | 27.5 | 25.0 | 0.0 | 2.5 | 10.0 | 0.0 | 2.5 | 12.5 | 12.5 | 5.0 | 2.5 |
| Embodiment 18 | mol % | 25.0 | 30.0 | 0.0 | 2.5 | 10.0 | 0.0 | 2.5 | 12.5 | 12.5 | 2.5 | 2.5 |
| Embodiment 19 | mol % | 45.4 | 0.0 | 0.0 | 3.8 | 0.0 | 0.0 | 0.0 | 0.0 | 0.0 | 0.0 | 48.5 |
| Embodiment 20 | mol % | 0.0 | 28.0 | 20.0 | 0.0 | 0.0 | 0.0 | 0.0 | 0.0 | 0.0 | 30.0 | 20.0 |
| Embodiment 21 | mol % | 0.0 | 25.0 | 25.0 | 0.0 | 0.0 | 0.0 | 0.0 | 0.0 | 0.0 | 10.0 | 30.0 |
| Embodiment 22 | mol % | 0.0 | 35.0 | 15.0 | 0.0 | 0.0 | 0.0 | 2.0 | 0.0 | 24.0 | 0.0 | 24.0 |
| Embodiment 23 | mol % | 0.0 | 31.0 | 21.0 | 0.0 | 0.0 | 0.0 | 0.0 | 0.0 | 6.0 | 6.0 | 36.0 |
| Embodiment 24 | mol % | 0.0 | 20.0 | 35.0 | 0.0 | 0.0 | 0.0 | 5.0 | 0.0 | 5.0 | 0.0 | 35.0 |
| Embodiment 25 | mol % | 0.0 | 30.0 | 25.0 | 0.0 | 0.0 | 0.0 | 15.0 | 0.0 | 0.0 | 0.0 | 30.0 |
| Embodiment 26 | mol % | 0.0 | 30.0 | 25.0 | 0.0 | 0.0 | 15.0 | 0.0 | 0.0 | 0.0 | 0.0 | 30.0 |
| Embodiment 27 | mol % | 0.0 | 30.0 | 25.0 | 0.0 | 15.0 | 0.0 | 0.0 | 0.0 | 0.0 | 0.0 | 30.0 |
| Embodiment 28 | mol % | 0.0 | 30.0 | 25.0 | 0.0 | 0.0 | 0.0 | 10.0 | 0.0 | 0.0 | 0.0 | 30.0 |
| Embodiment 29 | mol % | 0.0 | 30.0 | 25.0 | 0.0 | 0.0 | 0.0 | 15.0 | 0.0 | 0.0 | 0.0 | 10.0 |
| Embodiment 30 | mol % | 0.0 | 30.0 | 25.0 | 0.0 | 0.0 | 0.0 | 20.0 | 10.0 | 0.0 | 0.0 | 15.0 |
| Embodiment 31 | mol % | 0.0 | 40.0 | 25.0 | 0.0 | 0.0 | 0.0 | 30.0 | 0.0 | 0.0 | 0.0 | 0.0 |
| Embodiment 32 | mol % | 0.0 | 30.0 | 25.0 | 0.0 | 0.0 | 0.0 | 0.0 | 0.0 | 0.0 | 0.0 | 45.0 |
| Embodiment 33 | mol % | 0.0 | 30.0 | 25.0 | 0.0 | 0.0 | 0.0 | 0.0 | 5.0 | 0.0 | 0.0 | 40.0 |
| Embodiment 34 | mol % | 0.0 | 30.0 | 25.0 | 0.0 | 0.0 | 0.0 | 0.0 | 0.0 | 5.0 | 0.0 | 40.0 |
| Embodiment 35 | mol % | 0.0 | 30.0 | 25.0 | 0.0 | 0.0 | 0.0 | 0.0 | 0.0 | 0.0 | 5.0 | 40.0 |
| Embodiment 36 | mol % | 0.0 | 30.0 | 25.0 | 0.0 | 0.0 | 0.0 | 0.0 | 0.0 | 0.0 | 0.0 | 40.0 |
| Embodiment 37 | mol % | 0.0 | 19.6 | 47.9 | 3.5 | 12.0 | 0.0 | 0.0 | 3.6 | 1.3 | 0.0 | 11.0 |
| Embodiment 38 | mol % | 0.0 | 8.6 | 53.1 | 2.2 | 23.2 | 0.0 | 1.1 | 0.0 | 0.0 | 0.0 | 8.1 |
| Embodiment 39 | mol % | 0.0 | 52.5 | 0.0 | 2.5 | 0.0 | 0.0 | 0.0 | 0.0 | 0.0 | 0.0 | 0.0 |

| | | ZnO | $La_2O_3$ | $Gd_2O_3$ | $Y_2O_3$ | Total | Tg-$_{TMA}$ (° C.) | Ts (° C.) | α100-300 (1/K) | DHNO3 (wt %/min) |
|---|---|---|---|---|---|---|---|---|---|---|
| Embodiment 15 | mol % | 2.0 | 0.0 | 0.0 | 0.0 | 100.0 | 489 | 532 | 120 | 0.16% |
| Embodiment 16 | mol % | 0.0 | 0.0 | 0.0 | 0.0 | 100.0 | 484 | 528 | 112 | 0.25% |
| Embodiment 17 | mol % | 0.0 | 0.0 | 0.0 | 0.0 | 100.0 | 497 | 540 | 101 | 0.21% |

TABLE 5-continued

| | | | | | | | Tg-TMA | Ts | FA | D-HNO₃ |
|---|---|---|---|---|---|---|---|---|---|---|
| Embodiment 18 | mol % | 0.0 | 0.0 | 0.0 | 0.0 | 100.0 | 498 | 542 | 91 | 0.29% |
| Embodiment 19 | mol % | 0.0 | 0.0 | 2.3 | 0.0 | 100.0 | 558 | 602 | 140 | 0.02% |
| Embodiment 20 | mol % | 0.0 | 0.0 | 0.0 | 2.0 | 100.0 | 586 | 625 | 110 | 0.17% |
| Embodiment 21 | mol % | 10.0 | 0.0 | 0.0 | 0.0 | 100.0 | 578 | 628 | 103 | 0.15% |
| Embodiment 22 | mol % | 0.0 | 0.0 | 0.0 | 0.0 | 100.0 | 607 | 664 | 108 | 0.14% |
| Embodiment 23 | mol % | 0.0 | 0.0 | 0.0 | 0.0 | 100.0 | 581 | 625 | 107 | 0.15% |
| Embodiment 24 | mol % | 0.0 | 0.0 | 0.0 | 0.0 | 100.0 | 576 | 635 | 109 | 0.17% |
| Embodiment 25 | mol % | 0.0 | 0.0 | 0.0 | 0.0 | 100.0 | 467 | 516 | 133 | 0.14% |
| Embodiment 26 | mol % | 0.0 | 0.0 | 0.0 | 0.0 | 100.0 | 472 | 515 | 126 | 0.17% |
| Embodiment 27 | mol % | 0.0 | 0.0 | 0.0 | 0.0 | 100.0 | 495 | 530 | 107 | 0.16% |
| Embodiment 28 | mol % | 5.0 | 0.0 | 0.0 | 0.0 | 100.0 | 509 | 559 | 117 | 0.12% |
| Embodiment 29 | mol % | 20.0 | 0.0 | 0.0 | 0.0 | 100.0 | 520 | 567 | 105 | 0.16% |
| Embodiment 30 | mol % | 0.0 | 0.0 | 0.0 | 0.0 | 100.0 | 460 | 506 | 133 | 0.16% |
| Embodiment 31 | mol % | 5.0 | 0.0 | 0.0 | 0.0 | 100.0 | 466 | 505 | 147 | 0.36% |
| Embodiment 32 | mol % | 0.0 | 0.0 | 0.0 | 0.0 | 100.0 | 580 | 620 | 107 | 0.16% |
| Embodiment 33 | mol % | 0.0 | 0.0 | 0.0 | 0.0 | 100.0 | 591 | 630 | 102 | 0.21% |
| Embodiment 34 | mol % | 0.0 | 0.0 | 0.0 | 0.0 | 100.0 | 592 | 632 | 106 | 0.17% |
| Embodiment 35 | mol % | 0.0 | 0.0 | 0.0 | 0.0 | 100.0 | 592 | 632 | 105 | 0.15% |
| Embodiment 36 | mol % | 5.0 | 0.0 | 0.0 | 0.0 | 100.0 | 586 | 627 | 102 | 0.18% |
| Embodiment 37 | mol % | 0.0 | 1.0 | 0.0 | 0.0 | 100.0 | 540 | 585 | 104 | 0.05% |
| Embodiment 38 | mol % | 3.2 | 0.4 | 0.0 | 0.0 | 100.0 | 474 | 517 | 89 | 0.03% |
| Embodiment 39 | mol % | 20.0 | 12.5 | 7.5 | 0.0 | 100.0 | 614 | 653 | 67 | 0.01% |

In the tables,

Tg-TMA: Glass transition temperature

Ts: Sag point

α(alpha)100-300: Coefficient of linear expansion in the high temperature range (100-300° C.)

FA: Degree of abrasion (the larger the number, the more readily the substance is abraded)

D-HNO₃: Etching rate

The etching rate was the average weight reduction rate per minute (wt % /min) when placed for 10 to 25 minutes in 50° C. 0.1N nitric acid (HNO₃). Employing samples 360 mm³ in volume with surface areas of 325 mm², the average rate of reduction in thickness per minute for an average weight reduction rate per minute of 0.1 (wt % /min) was given by 0.1 (wt % /min)×360/325≈(nearly equal to) 1.1 (micrometers/minute).

Next, a carbon-containing film was formed on the surface of the covered glass gob. That is, a glass gob that had been provided with a covering portion was placed in a reaction vessel and the air in the reaction vessel was exhausted. When hydrocarbon (acetylene gas was employed here) was introduced and thermally decomposed, a carbon film was formed on the surface of the glass material.

Following covering, the above-described glass gob was employed as a glass material in press molding. That is, a pressing mold comprised of upper and lower molds made of SiC and a sleeve mold, with a carbon-containing mold release film formed on the pressing surfaces of the upper and lower molds by sputtering, was heated to a temperature corresponding to a glass A viscosity of $10^{8.5}$ dPa·s. The glass material was heated to a temperature at which glass A exhibited a viscosity of $10^{7.2}$ dPa·s and fed into the pressing mold. During feeding, the glass material was maintained on a separable mold with air blowing and softened by heating. The mold was then separated with the glass material in a heat-softened state, causing the glass material to drop onto the lower mold.

Immediately after feeding, the glass material was pressed between the upper and lower molds with a prescribed load, and, while maintaining tight contact between the glass and the upper and lower molds, cooled to a temperature below the annealing temperature of glass A. The molded product was then removed from within the pressing mold. This press molding was conducted to continuously mold 100 pieces of molded product.

The molded products obtained were maintained in a 520° C. heating furnace for 2 hours, and then annealed by reducing the temperature by −50° C./hour. Following annealing, the molded products were subjected to centering and edging with a centering and edging machine, the outer perimeter of the molded products was removed, and the center of the outer diameter was aligned with the optical axis.

Etching was then conducted to remove the covering portion on the surface of the molded product. Specifically, the molded product was immersed in a 50° C. 0.1N HNO₃ aqueous solution for 300 seconds, withdrawn, cleaned with water, and dried.

Finally, an antireflective film was formed on the cleaned molded products to obtain glass lenses. The glass lenses formed from the glass materials of Embodiments 1 to 39 all fully conformed to the specifications of optical apparatuses in terms of shape precision and external appearance.

For comparison, samples having only carbon-containing films were fabricated without providing covering portions on the surface of glass gobs comprised of optical glass A that had been preformed as set forth above. When the comparative samples were subjected to the same continuous pressing as that set forth above, scratchlike surface reaction marks were observed on the surface of the molded product, beginning with the very first piece. Inspection of the pressing mold after pressing 20 pieces revealed that carbon and fusion products considered to be reaction products of carbon and glass had adhered to the surface.

INDUSTRIAL APPLICABILITY

The method of the present invention yields optical glass elements of adequately low strain, good external appearance, high refractive index, and good optical performance even from optical glasses having glass transition temperatures of 550° C. or higher. These optical glass elements can be suitably employed as the glass lenses that are mounted in optical systems such as image pickup apparatuses, and the like.

The invention claimed is:

1. A method for manufacturing an optical glass element, comprising:
    annealing a press-molded product obtained by press molding into a lens shape a glass material comprised of a core portion, comprised of an optical glass (the "first glass" hereinafter) with a transition temperature of 550° C. or higher and comprising $B_2O_3$ and $La_2O_3$, and a covering portion that is comprised of a second glass covering the surface of said core portion and ranges from 0.1 to 1,000 nm in thickness; and then
    removing the covering layer from the surface of the press-molded product to obtain an optical glass element by etching,
    wherein an etching rate of said second glass by an acid or alkali treatment is greater than an etching rate of said first glass, and
    wherein said second glass comprises one or more from among $La_2O_3$, $Y_2O_3$, $Sc_2O_3$, $Gd_2O_3$, $Lu_2O_3$, $ZrO_2$, and $HfO_2$.

2. The manufacturing method in accordance with claim 1, characterized in that said first glass has a refractive index nd of 1.7 or higher and an Abbé number v(nu)d of 25 or higher.

3. The manufacturing method in accordance with claim 1, characterized in that said first glass is an optical glass comprising $B_2O_3$, ZnO, $La_2O_3$, and $ZrO_2$ in the form of a glass comprising, denoted as mol percentages, 0 (inclusive) to 15 percent of $Li_2O$, 20 to 50 percent of $B_2O_3$, 0 to 20 percent of $SiO_2$, 5 to 42 percent of ZnO, 5 to 24 percent of $La_2O_3$, 0 to 20 percent of $Gd_2O_3$ (where the total quantity of $La_2O_3$ and $Gd_2O_3$ is 10 to 24 percent), 0.5 to 10 percent of $ZrO_2$, 0 to 15 percent of $Ta_2O_5$, 0 to 20 percent of $WO_3$, 0 to 20 percent of $Nb_2O_5$, 0 to 20 percent of $TiO_2$, 0 to 10 percent of $Bi_2O_3$, 0 to 10 percent of $GeO_2$, 0 to 10 percent of $Ga_2O_3$, 0 to 10 percent of $Al_2O_3$, 0 to 10 percent of RO (R=Ca, Sr, Ba), 0 to 10 percent of $R'_2O$ (R'=Na, K), 0 to 10 percent of $Y_2O_3$, and 0 to 10 percent of $Yb_2O_3$.

4. The manufacturing method in accordance with claim 1, characterized in that said first glass is an optical glass comprising $B_2O_3$, $La_2O_3$, and ZnO in the form of a glass comprising, denoted as mol percentages, 20 to 60 percent of $B_2O_3$, 0 to 20 percent of $SiO_2$, 2 to 40 percent of ZnO, 5 to 24 percent of $La_2O_3$, 0 to 20 percent of $Gd_2O_3$ (where the total quantity of $La_2O_3$ and $Gd_2O_3$ is 10 to 24 percent), 0 to 10 percent of $ZrO_2$, 0 to 10 percent of $Ta_2O_5$, 0 to 10 percent of $WO_3$, 0 to 15 percent of $Nb_2O_5$, 0 to 10 percent of $TiO_2$, 0 to 10 percent of $Bi_2O_3$, 0 to 10 percent of $GeO_2$, 0 to 10 percent of $Ga_2O_3$, 0 to 10 percent of $Al_2O_3$, 0 to 10 percent of RO (R=Ca, Sr, Ba), 0 to 10 percent of $R'_2O$ (R'=Li, Na, K), 0 to 10 percent of $Y_2O_3$, and 0 to 10 percent of $Yb_2O_3$.

5. The manufacturing method in accordance with claim 1, characterized in that the total content of $TiO_2$, $Nb_2O_5$, $WO_3$, and $Bi_2O_3$ in said second glass is 5 mol percent or less.

6. The manufacturing method in accordance with claim 1, wherein annealing of the press-molded product is conducted by raising the temperature of the press molded product to within (Tg −70° C.) to (Tg +20° C.), maintaining a constant temperature for a certain period, and when the prescribed period has expired, cooling said press-molded product.

7. The manufacturing method in accordance with claim 1, wherein the covering layer on the surface of the press-molded product is removed by a prescribed acid or alkali treatment.

8. A method for manufacturing an optical glass element, comprising:
    annealing a press-molded product obtained by press molding into a lens shape a glass material comprised of a core portion comprised of an optical glass (the "first glass" hereinafter) with a transition temperature of 550° C. or higher and a covering portion that is comprised of a second glass covering the surface of said core portion; and then
    removing the covering layer from the surface of the press-molded product to obtain an optical glass element by etching,
    wherein an etching rate of said second glass by an acid or alkali treatment is greater than an etching rate of said first glass, and
    wherein said second glass comprises one or more from among $La_2O_3$, $Y_2O_3$, $Sc_2O_3$, $Gd_2O_3$, $Lu_2O_3$, $ZrO_2$, and $HfO_2$.

9. The manufacturing method in accordance with claim 8, wherein said first glass has a refractive index nd of 1.7 or higher and an Abbé number v(nu)d of 25 or higher.

10. The manufacturing method in accordance with claim 9, wherein said first glass is an optical glass comprising $B_2O_3$, ZnO, $La_2O_3$, and $ZrO_2$ in the form of a glass comprising, denoted as mol percentages, 0 (inclusive) to 15 percent of $Li_2O$, 20 to 50 percent of $B_2O_3$, 0 to 20 percent of $SiO_2$, 5 to 42 percent of ZnO, 5 to 24 percent of $La_2O_3$, 0 to 20 percent of $Gd_2O_3$ (where the total quantity of $La_2O_3$ and $Gd_2O_3$ is 10 to 24 percent), 0.5 to 10 percent of $ZrO_2$, 0 to 15 percent of $Ta_2O_5$, 0 to 20 percent of $WO_3$, 0 to 20 percent of $Nb_2O_5$, 0 to 20 percent of $TiO_2$, 0 to 10 percent of $Bi_2O_3$, 0 to 10 percent of $GeO_2$, 0 to 10 percent of $Ga_2O_3$, 0 to 10 percent of $Al_2O_3$, 0 to 10 percent of RO (R=Ca, Sr, Ba), 0 to 10 percent of $R'_2O$ (R'=Na, K), 0 to 10 percent of $Y_2O_3$, and 0 to 10 percent of $Yb_2O_3$.

11. The manufacturing method in accordance with claim 9, wherein said first glass is an optical glass comprising $B_2O_3$, $La_2O_3$, and ZnO in the form of a glass comprising, denoted as mol percentages, 20 to 60 percent of $B_2O_3$, 0 to 20 percent of $SiO_2$, 2 to 40 percent of ZnO, 5 to 24 percent of $La_2O_3$, 0 to 20 percent of $Gd_2O_3$ (where the total quantity of $La_2O_3$ and $Gd_2O_3$ is 10 to 24 percent), 0 to 10 percent of $ZrO_2$, 0 to 10 percent of $Ta_2O_5$, 0 to 10 percent of $WO_3$, 0 to 15 percent of $Nb_2O_5$, 0 to 10 percent of $TiO_2$, 0 to 10 percent of $Bi_2O_3$, 0 to 10 percent of $GeO_2$, 0 to 10 percent of $Ga_2O_3$, 0 to 10 percent of $Al_2O_3$, 0 to 10 percent of RO (R=Ca, Sr, Ba), 0 to 10 percent of $R'_2O$ (R'=Li, Na, K), 0 to 10 percent of $Y_2O_3$, and 0 to 10 percent of $Yb_2O_3$.

12. The manufacturing method in accordance with claim 9, wherein the total content of $TiO_2$, $Nb_2O_5$, $WO_3$, and $Bi_2O_3$ in said second glass is 5 mol percent or less.

13. The manufacturing method in accordance with claim 9, wherein annealing of the press-molded product is conducted by raising the temperature of the press molded product to within (Tg −70° C.) to (Tg +20° C.), maintaining a constant temperature for a certain period, and when the prescribed period has expired, cooling said press-molded product.

14. The manufacturing method in accordance with claim 9, wherein the covering layer on the surface of the press-molded product is removed by a prescribed acid or alkali treatment.

15. The manufacturing method in accordance with claim 9, wherein said covering portion ranges from 0.1 to 1,000 nm in thickness.

16. The manufacturing method in accordance with claim 8, wherein said first glass is an optical glass comprising $B_2O_3$, ZnO, $La_2O_3$, and $ZrO_2$ in the form of a glass comprising, denoted as mol percentages, 0 (inclusive) to 15 percent of $Li_2O$, 20 to 50 percent of $B_2O_3$, 0 to 20 percent of $SiO_2$, 5 to 42 percent of ZnO, 5 to 24 percent of $La_2O_3$, 0 to 20 percent of $Gd_2O_3$ (where the total quantity of $La_2O_3$ and $Gd_2O_3$ is 10 to 24 percent), 0.5 to 10 percent of $ZrO_2$, 0 to 15 percent of $Ta_2O_5$, 0 to 20 percent of $WO_3$, 0 to 20 percent of $Nb_2O_5$, 0 to 20 percent of $TiO_2$, 0 to 10 percent of $Bi_2O_3$, 0 to 10 percent of $GeO_2$, 0 to 10 percent of $Ga_2O_3$, 0 to 10 percent of $Al_2O_3$, 0 to 10 percent of RO (R=Ca, Sr, Ba), 0 to 10 percent of $R'_2O$ (R'=Na, K), 0 to 10 percent of $Y_2O_3$, and 0 to 10 percent of $Yb_2O_3$.

17. The manufacturing method in accordance with claim 8, wherein said first glass is an optical glass comprising $B_2O_3$, $La_2O_3$, and ZnO in the form of a glass comprising, denoted as mol percentages, 20 to 60 percent of $B_2O_3$, 0 to 20 percent of $SiO_2$, 2 to 40 percent of ZnO, 5 to 24 percent of $La_2O_3$, 0 to 20 percent of $Gd_2O_3$ (where the total quantity of $La_2O_3$ and $Gd_2O_3$ is 10 to 24 percent), 0 to 10 percent of $ZrO_2$, 0 to 10 percent of $Ta_2O_5$, 0 to 10 percent of $WO_3$, 0 to 15 percent of $Nb_2O_5$, 0 to 10 percent of $TiO_2$, 0 to 10 percent of $Bi_2O_3$, 0 to 10 percent of $GeO_2$, 0 to 10 percent of $Ga_2O_3$, 0 to 10 percent of $Al_2O_3$, 0 to 10 percent of RO (R=Ca, Sr, Ba), 0 to 10 percent of $R'_2O$ (R'=Li, Na, K), 0 to 10 percent of $Y_2O_3$, and 0 to 10 percent of $Yb_2O_3$.

18. The manufacturing method in accordance with claim 8, wherein the total content of $TiO_2$, $Nb_2O_5$, $WO_3$, and $Bi_2O_3$ in said second glass is 5 mol percent or less.

19. The manufacturing method in accordance with claim 8, wherein annealing of the press-molded product is conducted by raising the temperature of the press molded product to within (Tg −70° C.) to (Tg +20° C.), maintaining a constant temperature for a certain period, and when the prescribed period has expired, cooling said press-molded product.

20. The manufacturing method in accordance with claim 8, wherein the covering layer on the surface of the press-molded product is removed by a prescribed acid or alkali treatment.

21. The manufacturing method in accordance with claim 8, wherein said covering portion ranges from 0.1 to 1,000 nm in thickness.

* * * * *